United States Patent Office 3,184,281
Patented May 18, 1965

3,184,281
PROCESS FOR DYEING POLYOLEFIN ARTICLES
Yoshio Tsunoda, Tokyo, Toru Taneda, Ibaragi-shi, Kiyoshi Akamatsu, Itami-shi, and Kenichi Matsui, Hirakata-shi, Japan, assignors to Asahi Kasei Kogyo Kabushiki Kaisha, Osaka, Japan, a corporation of Japan
No Drawing. Filed Dec. 20, 1962, Ser. No. 245,978
Claims priority, application Japan, Feb. 2, 1962, 37/3,292
13 Claims. (Cl. 8—4)

This invention relates to processes for improving the dyeability of articles made of polyolefins.

It is well known that the poor dyeing characteristics of polyolefin constitutes a problem which is important in spite of the many other excellent properties of this material. It is also known that many attempts have been made to improve the dyeability of polyolefins.

These attempts include admixing the polyolefins with the condensation polymers of polyaminotriazoles, polytriazoles, polyethylene imines, polyamides, polyurethanes or polyureas which have an affinity for acid dyes, substituting amino groups for chlorine in chlorinated polyolefin articles, and grafting onto polyolefin articles such compounds as 2-methyl-5-vinyl pyridine and so on.

However, the polyolefin is not improved by these known methods to an extent such as to be suitable for dyeing by all kinds of acid dyes. Further, polyolefin articles, which are improved to an extent such that their excellent physical properties are not damaged, can hardly be dyed with an efficient exhaustion of dye in the associated dyebath and, moreover, cannot be dyed to deep or black shades.

It has now been found, according to the invention, that the dyeability of polyolefin articles can be improved remarkably by employing naphthalene compounds including oxynaphthoic acids and their derivatives such as 2-oxy-1-naphthoic acid, 1-oxy-2-naphthoic acid, 3-oxy-2-naphthoic acid, 4-chlor-3-oxy-2-naphthoic acid, 4-methoxy-3-oxy-2-naphthoic acid, and 8-chlor-2-oxy-1-naphthoic acid which have a pair of carboxyl and hydroxyl groups adjacent each other in the naphthalene nucleus and hydrogen, halogen and alkyl, alkoxy, hydroxyl, carboxyl and aldehyde groups in the other position, and also in combination with at least one of the group consisting of aromatic carboxylic acids such as benzoic acid, salicylic acid, o-chlorbenzoic acid, 5-chlor salicylic acid and cresotic acid.

It is an object of the present invention to provide a process for improving the dyeability of polyolefin articles by the use of said naphthalene compounds.

It is another object of the invention to provide improved processes for remarkably improving the dyeing efficiency of said articles by employing said compounds in a dye bath or by adding said compounds to a printing paste containing dyes.

It is a further object of the invention to provide an improved process for dyeing or printing on polyolefin articles without harming the other physical properties of this material.

According to the invention, the kind and quantity of said compound, whose naphthalene nucleus has hydroxyl and carboxyl groups, can be determined depending on the type of dyeable polyolefin articles involved and the improvement in dyeability which is desired. The quantity of the naphthalene compound to be added is preferably 0.5 g./l. to 3 g./l. but this quantity can be varied in accordance with convenience and economy in the dyeing procedure. The naphthalene compound may, for example, be added to the dyeing bath and then the bath temperature made gradually higher. Alternatively, the naphthalene compound may be gradually added to the bath. The polyolefin articles may be preferably immersed in a solvent such as benzole or alcohol in which the naphthalene compound has been dissolved. In this case, it is generally preferable that the polyolefin articles be treated with a solution having a concentration of 10% to 30% at 40° C. to 60° C. for 20 to 60 minutes. Sulfuric acid, salts and solvents, all of which are used in general dyeing procedures, can be employed in the above procedures within the scope of the present invention. For printing, the quantity of said naphthalene compound to be used in the paste, which is selected depending upon the kind of paste and quantity of dye to be used, is in the range of 0.5% to 3% based on the paste.

The present invention provides numerous advantages. Firstly, the present invention enables an efficient dyeing and printing of polyolefin articles and is of value from the viewpoint of economics. Secondly, the invention contributes to the improvement of the physical properties and the processability of polyolefin articles, because the invention enables the use of a polyolefin which is less modified than with conventional techniques. Thirdly, the invention enables the use of all kinds of commercially available acid dyes for the dyeing of polyolefin articles and further yields durable products which may be dyed or printed in all shades.

The details of the present invention will be better understood from a consideration of the following examples, given for purposes of illustration:

Example 1

2% by weight of polyoctamethylenaminotriazole was added to powdered polypropylene resin having an average molecular weight of about 100,000. The resulting mixture was subjected to melt spinning to produce a yarn comprising monofilaments of 3 deniers. The yarn was immersed in a dye bath containing 3% of Acid Orange II (Color Index No. Acid Orange 7; 15510) and 5% of 3-oxy-2-naphthoic acid by weight based on the yarn, at a bath ratio of 25 times at 100° C. for one hour whereby the yarn was dyed in brilliant orange color. The dyed material had a JIS 5th class fastness with respect to rubbing and washing. The exhaustion of dye from the dye bath was 95%. When the same yarn was dyed under the same conditions with the exception that acetic acid was used instead of 3-oxy-2-naphthoic acid with a dye bath of pH 3, the exhaustion of dye from the dye bath was 75%.

Example 2

7% by weight of polyoctamethyleneaminotriazole was added to powdered polypropylene resin having an average molecular weight of about 100,000. The resulting mixture was subjected to melt spinning to produce yarn comprising monofilaments of 5 deniers. The yarn was immersed in a dye bath containing 3% of Alizarine Sapphirol B (Color Index No. Acid Blue 45; 63030) and 4% of 2-oxy-1-naphthoic acid based on the weight of yarn at a bath ratio of 25 times at 100° C. for one hour. The dyed material had JIS 5th class fastness with respect to rubbing and to washing. The exhaustion of dye from the dye bath was 98%. When the same yarn was dyed under the same conditions with the exception that acetic acid was used instead of 3-oxy-2-naphthoic acid with a dye bath of pH 3, the exhaustion of dye from the dye bath was 86%.

Example 3

2% by weight of polytetramethyleneaminotriazole was added to powered low-pressure polyethylene resin having an average molecular weight of about 150,000. The resulting mixture was subjected to melt spinning to produce yarn comprising monofilaments of 5 deniers. The yarn was immersed in a dye bath containing 3% of Alizarine Fast Green G (Color Index No. Acid Green 25; 61570) and 5% of 4-methyl-3-oxy-2-naphthoic acid based on the weight of the yarn, at a bath ratio of 25 times at 100° C. for one hour. The dyed material had a JIS 5th class fastness with respect to rubbing as well as to washing. The exhaustion of dye from the dye bath was 95%. When the same yarn was dyed under the same conditions except that the solution had a pH of 3 due to the use of acetic acid instead of 4-methyl-3-oxy-2-naphthoic acid, the exhaustion of dye from the dye bath was 70%.

*Example 4*

5% by weight of polyethyleneimine was added to powdered polypropylene resin having an average molecular weight of about 100,000. The resulting mixture was subjected to melt spinning to produce yarn comprising monofilaments of 5 deniers. The yarn was immersed in a dye bath containing 3% of Carbolan Violet 2RS (Color Index No. Acid Violet 51; 62165) and 4% of 4-methoxy-3-oxy-2-naphthoic acid based on the weight of the yarn at a bath ratio of 25 times at 100° C. for one hour. The dyed material had a JIS 5th class fastness with respect to rubbing and to washing. The exhaustion of dye from the dye bath was 97%.

When the same yarn was dyed under the same conditions except that a pH of 3 was provided by using acetic acid instead of 4-methoxy-3-oxy-2-naphthoic acid, the exhausion of dye from the dye bath was 78%.

*Example 5*

2% by weight of polytetramethyleneaminotriazole was added to powdered polypropylene resin having an average molecular weight of about 100,000. The resulting mixture was subjected to melt spinning to produce yarn comprising monofilaments of 5 deniers. The yarn was immersed in a dye bath containing 3% of Naphthalene Scarlet RS (Color Index No. Acid Red 26; 16150) and 4% of 1-oxy-2-naphthoic acid based on the weight of the yarn at a bath ratio of 25 times at 100° C. for 1 hour. The dyed material had a JIS 5th class fastness with respect to rubbing and to washing. The exhaustion of dye from the dye bath was 90%. When the same yarn was dyed under the same conditions except that acetic acid was used instead of 1-oxy-2-naphthoic acid and the pH of the solution was 3, the exhaustion of dye from the dye bath was 65%.

*Example 6*

2% by weight of polyoctamethyleneaminotriazole was added to powdered polypropylene resin having an average molecular weight of about 100,000. The resulting mixture was subjected to melt spinning to produce yarn comprising 30 filaments of 90 deniers. Taffeta which was woven with said yarn was printed with a colored paste containing 55 parts of British Gum paste, 5 parts of glycerine, one part of Kitons Fast Red R (Color Index No. Acid Red 5; 14905), 2 parts of 3-oxy-2-naphthoic acid and 37 parts of water, steamed at 100° C. for one hour and washed. The printed taffeta had a JIS 5th class fastness with respect to rubbing and to washing.

*Example 7*

3% by weight of polytetramethyleneaminotriazole was added to powdered polybutene resin having an average molecular weight of about 100,000. The resulting mixture was subjected to melt spinning to produce yarn comprising monofilaments of 3 deniers. The yarn was immersed in a dye bath containing 3% of Alizarine Rubinol 3G (Color Index No. Acid Red 2; 68205) and 4% of 6-methoxy-1-oxy-2-naphthoic acid based on the weight of the yarn at a bath ratio of 30 times at 100° C. for one hour. The dyed material had a JIS 5th class fastness with respect to rubbing and to washing. The exhaustion of dye from the dye bath was 93%. When the same yarn was dyed under the same conditions except that acetic acid was used instead of 6-methoxy-1-oxy-2-naphthoic acid to obtain a solution with a pH of 3.5, the exhaustion of dye from the dye bath was 60%.

*Example 8*

3% by weight of polyoctamethyleneaminotriazole was mixed with powdered polypropylene resin having an average molecular weight of about 100,000. The mixture was made into pellets by means of a pelletizer. The pellets were extruded to make a tube of 2 mm.-diameter by means of an extruder at 250° C. The tube was immersed in a dye bath containing 3% of Lissamine Fast Red 3G (Color Index No. Acid Red 5; 14905) and 3% of 8-chlor-3-oxy-2-naphthoic acid based on the weight of the tube at a bath ratio of 25 times at 100° C. for one hour.

*Example 9*

2% of polyoctamethyleneaminotriazole and 2% of polyoctamethylenetriazole by weight were added to powdered polypropylene resin having an average molecular weight of about 100,000. The resulting mixture was subjected to melt spinning to produce yarn comprising monofilaments of 3 deniers. The yarn was immersed in a dye bath containing 3% of Benzyl Fast Red B (Color Index No. Acid Red 106; 18110) and 4% of 3-oxy-2-naphthoic acid based on the weight of the yarn at a bath ratio of 30 times at 100° C. for 1 hour. The dyed material had JIS 5th class fastness with respect to rubbing and washing. The exhaustion of dye from the dyebath was 95%. When the same yarn was dyed under the same conditions except that acetic acid was used instead of 3-oxy-2-naphthoic acid such that the pH of the bath was 3, the exhaustion of dye from the dye bath was 80%.

*Example 10*

7% of epoxy resin by weight was added to powdered polypropylene resin having an average molecular weight of about 100,000. The resulting mixture was subjected to melt spinning to produce yarn comprising monofilaments of 3 deniers. The yarn was immersed in a dye bath containing 3% of Celliton Fast Blue FFG (Color Index No. Disperse Blue 6; 62050) and 4% of 3-oxy-2-naphthoic acid by weight based on yarn at a bath ratio of 30 times at 100° C. for one hour. The dyed material had a JIS 5th class fastness with respect to rubbing and to washing. The exhaustion of dye from the dye bath was 94%. When the same yarn was dyed under the same conditions except that 3-oxy-2-naphthoic acid was not added, the exhaustion of dye from the dye bath was 59%.

*Example 11*

Powdered polypropylene resin having an average molecular weight of about 100,000 was chlorinated and the resulting material was subjected to melt spinning to produce yarn comprising monofilaments of 3 deniers. The yarn was treated with ethanol amine and immersed in a dye bath containing 3% of Kiton Fast Yellow 2R (Color Index No. Acid Yellow 25; 18835) and 3% of 4-bromo-3-oxy-2-naphthoic acid based upon the weight of yarn at a bath ratio of 30 times at 100° C. for one hour. The dyed material had a JIS 5th class fastness with respect to rubbing and to washing. The exhaustion of dye from the dye bath was 93%. When the same yarn was dyed under the same conditions except that acetic acid was used instead of 4-bromo-3-oxy-2-naphthoic acid to obtain a solution with a pH of 3.5, the exhaustion of dye from the dye bath was 75%.

*Example 12*

3% of polyoctamethyleneaminotriazole by weight was added to powdered polypropylene resin having an average molecular weight of about 100,000. The resulting material was subjected to melt spinning to produce yarn comprising monofilaments of 3 deniers. The yarn was immersed in a dye bath containing 3% of Alizarine Fast Blue 3R (Color Index No. Acid Blue 80; 61585) and 2% of 3-oxy-2-naphthoic acid and 4% of salicylic acid based on the weight of the yarn at a bath ratio of 30 times at 100° C. for one hour. The dyed material had a JIS 5th class fastness with respect to rubbing and to washing. The exhaustion of dye from the dye bath was 92%. When the same yarn was dyed under the same conditions except that acetic acid was used instead of 3-oxy-2-naphthoic acid to obtain a solution with a pH of 3.5, the exhaustion of dye from the dye bath was 75%.

*Example 13*

3% of polyoctamethylenetriazole by weight was added to powdered polypropylene resin having an average molecular weight of about 100,000. The resulting material was subjected to melt spinning to produce yarn comprising monofilaments of 3 deniers. The yarn was immersed in a dye bath containing 3% of Kiton Violet L (Color Index No. Acid Violet 1; 17025) and 4% of 1-oxy-2-naphthoic acid based on the weight of the yarn at a bath ratio of 30 times at 100° C. for one hour. The dyed material had a JIS 5th class fastness with respect to rubbing and to washing. The exhaustion of dye from the dye bath was 95%. When the same yarn was dyed under the same conditions except that acetic acid was used instead of 1-oxy-2-naphthoic acid to obtain a solution with a pH of 3.5, exhaustion of dye from the dye bath was 80%.

*Example 14*

3% of polyoctamethyleneaminotriazole by weight was added to powdered polypropylene resin having an average molecular weight of about 100,000. The resulting material was subjected to melt spinning to produce a yarn comprising monofilaments of 3 deniers. The yarn was immersed in a dye bath containing 3% of Lissamine Fast Violet 2B (Color Index No. Acid Violet 41; 62020) and 2% of 3-oxy-2-naphthoic acid and 3% of cresotic acid based on the weight of the yarn at a bath ratio of 30 times at 100° C. for one hour. The dyed material had a JIS 5th class fastness with respect to rubbing and to washing. The exhaustion of dye from the dye bath was 94%. When the same yarn was dyed under the same conditions except that acetic acid was used instead of 3-oxy-2-naphthoic acid and cresotic acid to obtain a solution with a pH of 3.5, the exhaustion of dye from the dyebath was 58%.

*Example 15*

3% of polyoctamethyleneaminotriazole by weight was added to powdered polypropylene resin having an average molecular weight of about 100,000. The resulting material was subjected to melt spinning to produce yarn comprising monofilaments of 3 deniers. The yarn was immersed in a dye bath containing 3% of Kiton Fast Red B2R (Color Index No. Acid Red 35; 18065) and 2% of 3-oxy-2-naphthoic acid and 2% of o-chlorbenzoic acid based on the weight of the yarn at a bath ratio of 30 times at 100° C. for one hour. The dyed material had a JIS 5th class fastness with respect to rubbing and to washing. The exhaustion of dye from the dye bath was 95%. When the same yarn was dyed under the same conditions except that acetic acid was used instead of 3-oxy-2-naphthoic acid and o-chlorbenzoic acid to obtain a solution with a pH of 3.5, the exhaustion of dye from the dye bath was 68%.

What is claimed is:

1. In a process for dyeing shaped articles produced from polyolefin material selected from the group consisting of polyethylene, polypropylene and polybutene-1, said polyolefin being modified by the addition thereto of at least one substance selected from the group consisting of polyaminotriazoles, polytriazoles, polyethyleneimines, polyamides and epoxy resins, the improvement comprising treating said articles wtih a naphthalene compound having a naphthalene nucleus with a pair of hydroxyl and carboxyl groups adjacent to each other therein selected from the group consisting of 2-oxy-1-naphthoic acid, 3-oxy-2-naphthoic acid, 4-chloro-3-oxy-2-naphthoic acid, 4-methoxy-3-oxy-2-naphthoic acid and 8-chlor-2-oxy-1-naphthoic acid.

2. A process as claimed in claim 1 comprising dyeing said articles in a dye bath including said naphthalene compound.

3. A process as claimed in claim 1 comprising pretreating the polyolefin article with said naphthalene compound.

4. A process as claimed in claim 1 comprising incorporating the naphthalene compound into a printing paste and applying the paste to the polyolefin article.

5. A process as claimed in claim 1 wherein the naphthalene compound is used in combination with at least one aromatic carboxylic acid of the benzene series consisting of benzoic acid, salicylic acid, O-chlorbenzoic acid, 5-chlorsalicylic acid and cresotic acid.

6. A process as claimed in claim 1 wherein the naphthalene compound is used together with a polyolefin swelling agent.

7. A process as claimed in claim 2 wherein the naphthalene compound is used in the range of 0.5 to 3 g./l. of dyeing bath.

8. In a process for dyeing shaped articles produced from polyolefin material selected from the group consisting of polyethylene, polypropylene and polybutene-1, said polyolefin being modified by chlorinating the polyolefin and substituting amino radicals for the chlorine in the chlorinated polyolefin in the resulting chlorinated polyolefin, the improvement comprising treating said articles with a naphthalene compound having a naphthalene nucleus with a pair of hydroxyl and carboxyl groups adjacent to each other therein selected from the group consisting of 2-oxy-1-naphthoic acid, 3-oxy-2-naphthoic acid, 4-chlor-3-oxy-2-naphthoic acid, 4-methoxy-3-oxy-2-naphthoic acid, and 8-chlor-2-oxy-1-naphthoic.

9. A process as claimed in claim 8 comprising dyeing said articles in a dye bath including said naphthalene compound.

10. A process as claimed in claim 8 comprising pretreating the polyolefin article with said naphthalene compound.

11. A process as claimed in claim 8 comprising incorporating the naphthalene compound into a printing paste and applying the paste to the polyolefin article.

12. A process as claimed in claim 8 wherein naphthalene compound is used in combination with at least one aromatic carboxylic acid of the benzene series consisting of benzoic acid, salicylic acid, O-chlorbenzoic acid, 5-chlor-salicylic acid and cresotic acid.

13. A process as claimed in claim 8 wherein the naphthalene compound is used together with a polyolefin swelling agent.

References Cited by the Examiner

UNITED STATES PATENTS

| | | | |
|---|---|---|---|
| 2,989,358 | 6/61 | Wolfgang | 8—46 |
| 3,107,228 | 10/63 | Cappuccio et al. | |
| 3,112,159 | 11/63 | Cappuccio et al. | |
| 3,112,981 | 12/63 | Fuortes et al. | 8—4 |

OTHER REFERENCES

Fern et al., J.S.D.C., 71, December 1955, pp. 840–856.

NORMAN G. TORCHIN, *Primary Examiner.*